(12) United States Patent
Anderson et al.

(10) Patent No.: US 12,210,497 B1
(45) Date of Patent: Jan. 28, 2025

(54) EVENT DEDUPLICATION USING MULTIPLE STAGES AND CONCURRENT PROCESSING

(71) Applicant: Amazon Technologies, Inc., Seattle, WA (US)

(72) Inventors: Karl Eric Anderson, Columbia, MD (US); Jacob A. Niebloom, Baltimore, MD (US); Kelly Anne Rooker, Ellicott City, MD (US); Martin C Stonebraker, Sparks, MD (US); Nebi Mert Aydin, Odenton, MD (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 17/936,787

(22) Filed: Sep. 29, 2022

(51) Int. Cl.
*G06F 16/215* (2019.01)
*G06F 16/23* (2019.01)

(52) U.S. Cl.
CPC ........ *G06F 16/215* (2019.01); *G06F 16/2322* (2019.01)

(58) Field of Classification Search
CPC .................. G06F 16/215; G06F 16/2322
See application file for complete search history.

(56) References Cited

U.S. PATENT DOCUMENTS

| 7,979,670 | B2 | 7/2011 | Saliba et al. |
| 9,661,074 | B2 | 5/2017 | Peake |
| 2015/0350260 | A1* | 12/2015 | Tadepalli ............. H04L 65/403 709/203 |
| 2021/0406287 | A1* | 12/2021 | Bar-on ................ G06Q 10/107 |

* cited by examiner

*Primary Examiner* — Cam Y T Truong
(74) *Attorney, Agent, or Firm* — Robert C. Kowert; Kowert, Hood, Munyon, Rankin & Goetzel, P.C.

(57) ABSTRACT

An event deduplication system may efficiently perform event deduplication (identifying "new" or "unique" events that might be an anomaly) by using a first stage that has multiple first stage processes running in parallel (e.g., at different data centers) and a single second stage that has a second stage process that receives and processes events from the different first stage processes. The second stage process updates a global state (e.g., lookup table) and periodically publishes the global state to the first stage processes to update their local state. When the second stage process receives a possible new event from a first stage process, it may more accurately determine whether the event is actually a new event based on the global state.

20 Claims, 6 Drawing Sheets

EVENT DEDUPLICATION USING MULTIPLE STAGES AND CONCURRENT PROCESSING

BACKGROUND

The ability to identify new events within a stream of data that are unique and have not been seen before (performing event deduplication) may be useful in a variety of applications associated with network security, social networks, and any others that may leverage the ability to identify new and/or anomalous events. In certain applications, it may be necessary to identify new events within an extremely large volume streaming data and from data streams at different locations. Due to high latency and coordination challenges, the process of collecting and identifying new events across different input streams and across various locations with large volumes of data can cause inaccurate results and reduced performance, particularly for real-time applications.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for event deduplication using multiple stages and concurrent processing. In various embodiments, an event deduplication system may include any number of first stage processes that run concurrently (e.g., in parallel). Each first stage process obtains events from an input stream of events and maintain a local state (e.g., using a local lookup table or other data structure). Each of the first stage processes may run/execute on a computing node (one or more computing device(s)) that may be at a different location (e.g., at different datacenters/networks at different geographic regions).

In embodiments, based on processing the obtained events, each of the first stage processes may send "possible new events" as well as "state promotion events" to a second stage process that maintains a global state (e.g., using a global lookup table or other data structure). The second stage process may run/execute on another computing node that may be at a different location from the first stage processors (e.g., at different datacenters/networks at different geographic regions). In embodiments, the second stage process may update the global state based on receiving the possible new events and the state promotion events.

Based on the global state, the second stage process may also output a possible new event as a new event. In various embodiments, the ability to run any number of first stage processes as a "triage" stage before sending events to a particular second stage process for a more accurate/refined identification of new events, event deduplication may be performed in a much more efficiently, with less latency, and in a much more scalable manner compared to traditional techniques of event deduplication. This may allow for efficiently performing event deduplication on massive streaming datasets and for efficiently scaling to handle changes in the amount of streaming data, while reducing the need for synchronization between different processes that handle input data streams.

As discussed herein, in various embodiments, an event deduplication system may efficiently handle a massive scale streaming dataset through the use of any number of first stage processes that obtain/process events from an input stream of events. In embodiments, an event of an input stream of events may be a particular portion/unit of data that may itself include any number of portions/elements (e.g., a JavaScript object notation (JSON) file with different field values). Within a massive scale streaming dataset, the event deduplication system may select and output events, based on a chosen key, if events are unique and have not been seen before (newness) and/or when an event reoccurs after a long period of inactivity (rarely occurring events). Detecting new or rarely occurring events may have application in many areas such as network security, anomaly detection, and social network analysis.

In embodiments, stage one of the event deduplication system may, in parallel, take a portion, slice, or buffer of events from an input stream and approximately filter duplicate events using a chosen key and based on a recent version of an in-memory local state structure that is updated locally to each parallel process, but is also periodically refreshed from a global state structure (e.g., global state table) that is published and shared from stage two. If a reoccurring event is observed at a stage process one and the known prior state for that key is likely to expire state from the global state table of stage two, then the stage one process may publish a promote state event (e.g., "promote key" event) to the stage two process in order to update the state in the global table. In embodiments, publishing an event/data may include sending or the event/data to a destination or otherwise causing the event/data to be sent to a destination (e.g., via a publish-subscribe mechanism or other protocol).

Stage two of the event deduplication system may, in serial, take the stream of approximate filtered results from stage one and filter out duplicate events using a chosen key and an in-memory state structure that is maintained by the stage two process (e.g., a global state table). The output of this stage may be a globally unique stream of events. The stage two process may periodically publish and share the known state structure (e.g., the global state table) for use in stage one and for stage two processing recovery. Stage two also consumes any "promote key" events from stage one by updating the state in the global state table to reduce the likelihood of expiration from a reoccurring event. In embodiments, the promote key event does not result in any output from the stage two process.

In embodiments, the state structure used for deduplication in both stages has a mechanism that expires old state based on a least recently used (LRU) sequence or time such that state that has not been accessed over a time period may expire-either explicitly based on a time window or based on data-pressure where the storing of new events over-writes older/oldest events (e.g., a cache-like property). In some embodiments, one or more optional stages may be introduced to provide further aggregation of state across regions and/or datasets. Additional state that is not based on approximate state tracking can also be introduced as an additional stage lookup for more refined filtering of events.

In various embodiments, a massive input stream may be divided up into slices, files, and/or buffers of data that can be processed in parallel, where there is no inherent sharding or organizing of data, in order to minimize search or a chosen key state space. The physical locality of the data may be distributed across geographic regions, boundaries, and/or datacenters within the stage one parallel processing.

An event for a given key may occur in any of the input slices, files, and/or buffers at any of the stage one processes. In embodiments, there may be no keyed, load-balanced input stream or any specific stream placement method used, and no synchronization may be employed between the stage one processes. The output of stage one that becomes the input to stage two may be a stream of buffers, a set of files, or other mechanisms to publish newly found events from one stage to another.

In some embodiments, the keyspace (or approximation of) for the active set of events to deduplicated may fit into memory using an efficient state store (e.g., a local or global state lookup table). The in-memory state store may be tracked approximately such that state structures based on digest hashes where the false positives of improperly matching a state element are based on the probability of a hash collision that is dependent on the digest size and table size.

In various embodiments, when the state store is full, it may have a mechanism to expire old events based on a least recently used or approximate least recently used methods. Queries to the state store may return a metric indicating the likelihood of data expiration, for use in data promotion when syncing state between stage one and two. The state store may be able to be serialized and deserialized to a shared storage system (e.g., a shared data storage service). In some embodiments, the state store may be implemented as a multi-way D-left hash table with LRU sorted index buckets; however, in various embodiments, the state store (e.g., the local state or global state) may be implemented as any type of data structure suitable for efficiently storing/sorting data and providing a suitable lookup time.

Figure 1:
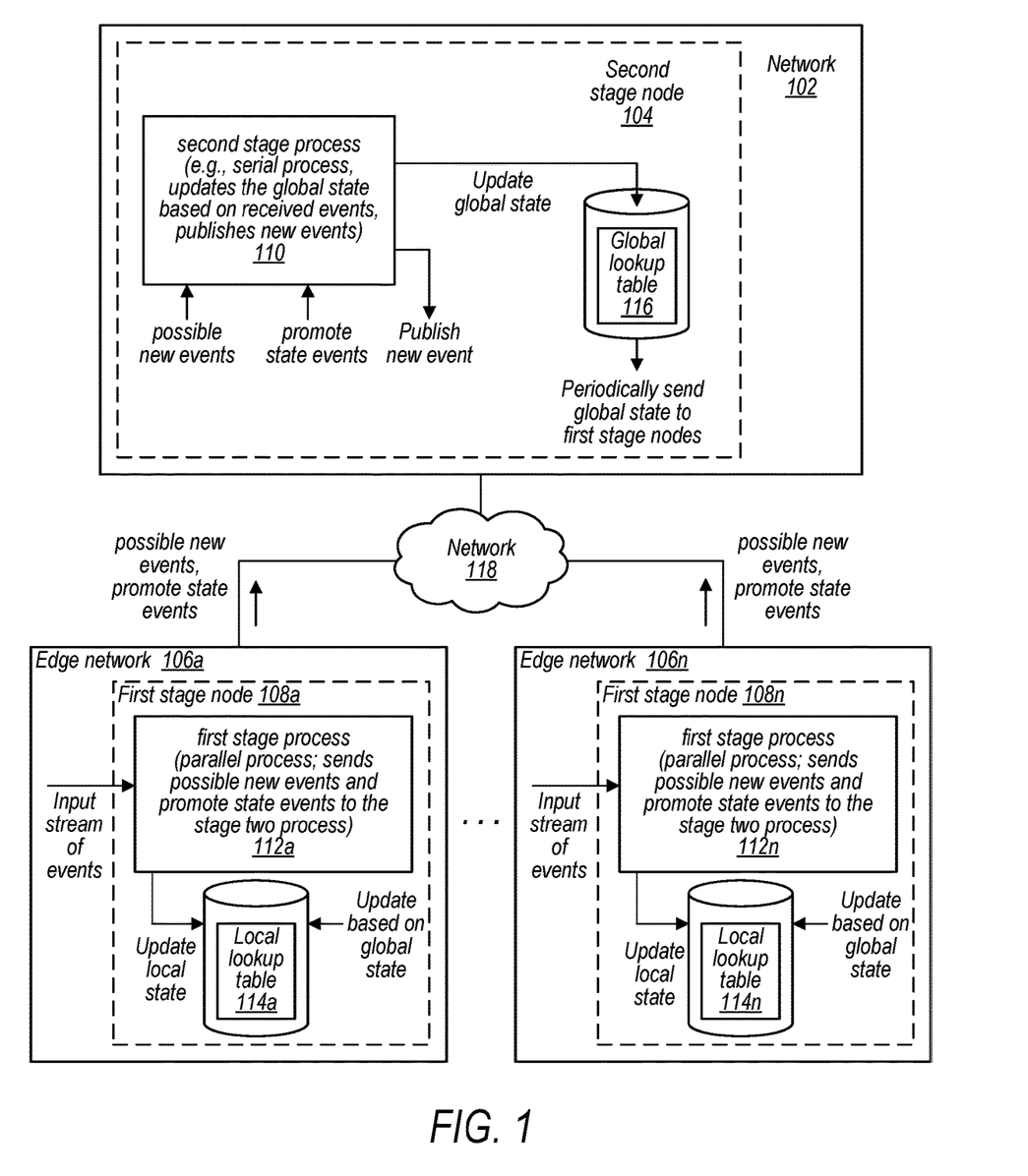
FIG. 1 illustrates a system for event deduplication using multiple stages and concurrent processing, according to some embodiments.

FIG. 1 illustrates a system for event deduplication using multiple stages and concurrent processing, according to some embodiments.

In embodiments, the network 102, the second storage node 104, the edge network 106, the first stage node 108, and/or any other components depicted in FIG. 1 may be the same as (or include one or more of the same components) as any components depicted in any of FIGS. 2-5. FIG. 6 depicts an example computer system(s) that may implement the nodes, processes, services, applications, networks, and/or any other components depicted in any of FIGS. 1-5.

In some embodiments, the second stage node 104 implements (e.g., runs/executes) a second stage process 110 that may receive possible new events and/or promote state events from any number of first stage processes 112 implemented by first stage nodes of any number of respective edge networks 106. As shown, each first stage process 112 may update the local state by updating a local lookup table 114 of the first stage node 108. In various embodiments, any other suitable data structure may be used to store the local state for a first stage process (or to store the global state). In the depicted example, the second stage process 110 may update the global state by updating a global lookup table 116 of the second stage node 104.

In embodiments, any of the first stage processes 112 may communicate with the second stage process 110 via a wide area network 118 (e.g., the Internet). Therefore, each of the edge networks 106 may be remote networks with respect to the network 102. In various embodiments, the network 118 may be any other suitable communication medium/device that allows for any of the first stage processes 112 may communicate with the second stage process 110. For example, the network 118 may instead be a communication bus, a communication device (e.g., router or switch), communication fabric, or any other suitable device/medium. In some embodiments, one or more (or all) of the first stage nodes may be a part of the same network (e.g., network 102).

In various embodiments, after an event is obtained by a first stage process 112, the first stage process may determine whether the event is a local reoccurring event based on a key for the event as well as a local state (e.g., stored in a local lookup table 114). In some embodiments, the first stage process may use a defined method/algorithm to generate a key for a given obtained event.

For example, the first stage process may identify different portions of the data of the obtained event and generate a key based on the different portions of identified data. As an example, for a network security application, the first stage process may identify/extract a host name (e.g., identifier of a server/computing device), an execution name (e.g., name of a program/process that was executed), and a user name for a user that executed the program process on the server/computer, and use the combination of the host name, execution name, and user name as a key.

The first stage process may determine, based on the key for the event and the local state, whether the event is a local reoccurring event (e.g., whether the local state indicates that the event has previously occurred). For example, the first stage process may determine, based on the key for the event, whether an entry for the event exists in the local lookup table (e.g., whether a hash of the key exists in the table). If not, then the first stage process determines that the event is not a local reoccurring event (e.g., the event is a possible new event).

If an entry does exist, then the first stage process determines that the event is a local reoccurring event (e.g., the event is not a new event). Note that in embodiments, the stage one process generates a digest based on hashing the key, in which case determining whether an entry for the event exists would include determining whether the lookup table has an entry for the digest.

In response to a determination that the event is not a local reoccurring event, the first stage process may update the local state based on the key for the event and send the event to the second stage process 110 of the event deduplication system as a possible new event. In embodiments, to update the local state, the first stage process may insert an entry into the local lookup table that corresponds to the key for the event (e.g., inserted into the front of a group of entries in the local lookup table that are ordered according to a most recently used to least recently used ordering). In some embodiments, the insertion may result in removing/evicting one of the older entries from the table.

In response to a determination that the event is a local reoccurring event, the first stage process may determine, based on the key for the event and the local state, whether to send a promote state event to the second stage process and may also update the local state based on the key for the event. In some embodiments, to determine to send a promote state event to the second stage process, the first stage process may determine that key for the event is likely to expire state (e.g., be removed/evicted) from the global state table of the second stage node (e.g., based on determining that at least a threshold amount of time has passed since the event was previously received, or based on determining that the entry for the event is within a threshold number of entries from the bottom of an ordered list of entries).

If the key for the event is likely to expire state, then the first stage process may send the promote state event (e.g., promote key event). In embodiments, to update the local state based on the key for the event, the first stage process may re-order a group of entries in the local lookup table, wherein an entry that corresponds to the key for the event is moved ahead within the group of entries (e.g., to the front) according to a most recently used to least recently used ordering (e.g., they are ordered according to a most recently used to least recently used ordering).

In embodiments, in response to receiving a possible new event from the first stage process, the second stage process may determine, based on the key for the event and a global state (e.g., global lookup table 116), whether the event is a global reoccurring event. If the second stage process determines it is not a global reoccurring event, then the second stage process may update the global state based on the key for the event (e.g., in the same/similar way as described above for updating the local state for a local event that is not a reoccurring event) and output the event as a new event.

However, if the second stage process determines it is a global reoccurring event, then the second stage process may update the global state based on the key for the event (e.g., in the same/similar way as described above for updating the local state for a local reoccurring event), without outputting a new event. Note that if the second stage process receives a promote state event from a first stage process, then in response, the second stage process may update the global state based on the key for the event (e.g., in the same/similar way as described above for updating the local state for a local reoccurring event).

In various embodiments, the second stage process may periodically send/publish the global state (e.g., the global lookup table) or at least a portion of the global state to each of the first stage processes, so that each first stage process may update/refresh the local state based on the global state (or at least the portion of the global state). In some embodiments, the second stage process may receive, from a first stage process, a request for the global state and in response, send the global state (or at least the portion of the global state) to the first stage process, which may update/refresh its local state based on the global state (or at least the portion of the global state). This may occur, for example, when the first stage process fails/resets or when it does not receive the global state due to a failure of transmission.

In embodiments, the number of first stage processes that are running in parallel (e.g., concurrently) on a given first stage node can be dynamic (e.g., increase or decrease in number), depending on the input load (rate of data to be processed in the input streams and/or volume of data of the input streams over a given time period). This may allow process utilization optimization and/or dynamic scaling in order to meet a surge of data. In some embodiments, such scale adjustments can be used to minimize processing costs (e.g., reducing the amount of computing resources being used at a given first stage node when they are not needed). In various embodiments, any number of the parallel first stage processes may be added or removed as the input load increases or decreases, allowing for highly scalable and low latency event deduplication.

Figure 2:
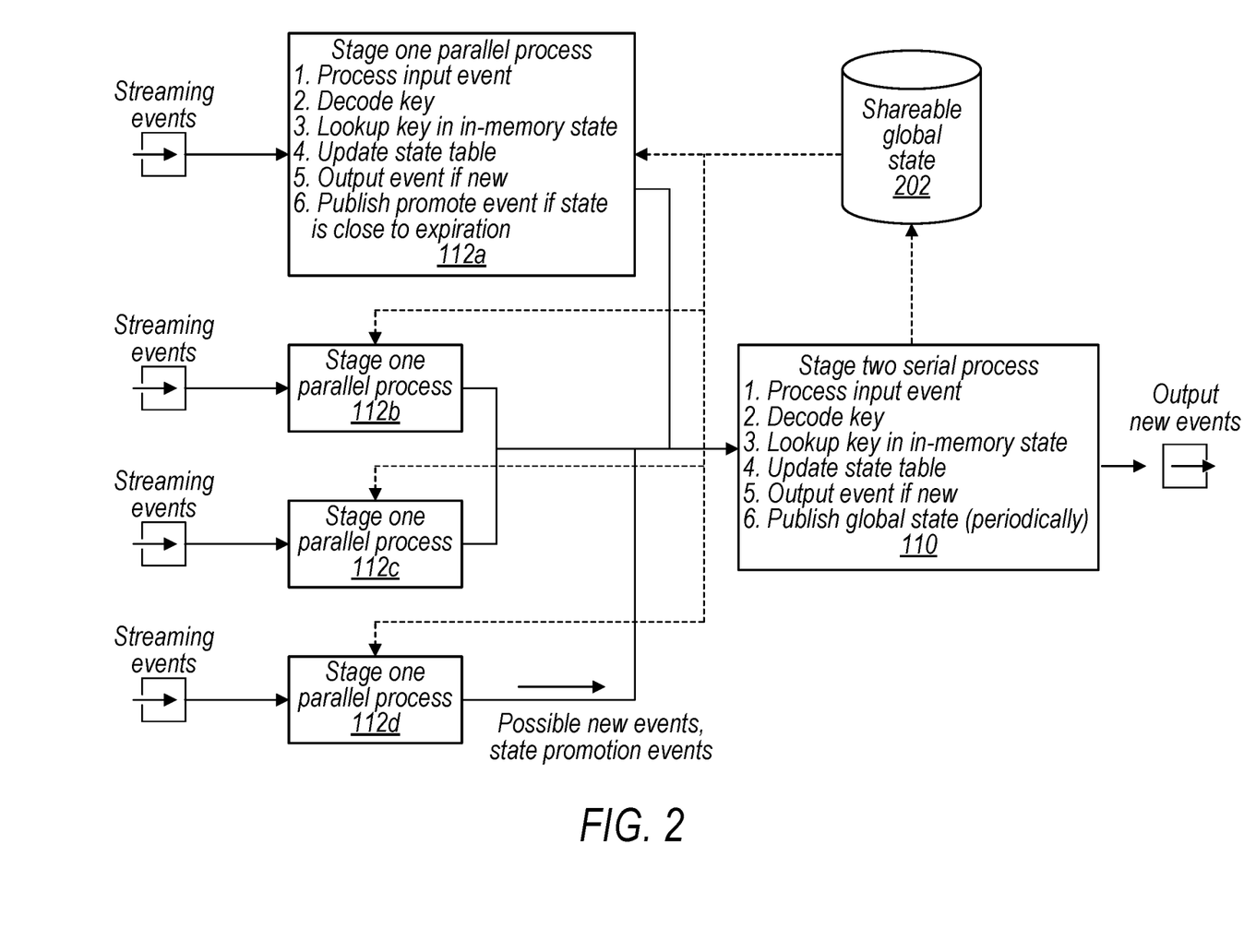
FIG. 2 illustrates a system for event deduplication using multiple stages and concurrent processing, according to some embodiments.

For example, a monitor running on a first stage nodes may determine that the input load exceeds a configured threshold number and in response, launch/execute any number of additional first stage processes in order to handle the additional data and to prevent decreased processing performance. Similarly, the monitor at the first stage nodes may determine that the input load falls below a configured threshold number and in response, close and/or terminate any number of additional first stage processes in order to reduce the amount of computing resources being used/minimize processing costs. S FIG. 2 illustrates a system for event deduplication using multiple stages and concurrent processing, according to some embodiments.

In the depicted example, an event deduplication includes four different first stage processes (stage one process 112a-112d) running in parallel and a second stage process (state two serial process 110) that receives possible new events and state promotion events from each of the first stage processes. The second stage process updates the shareable global state 202 (e.g., global lookup table 116) based on the possible new events and state promotion events.

As shown, each stage one parallel process may process an input event from a stream of events, decode a key for the event, lookup the key in the in-memory state (e.g., local lookup table 114), update the local state table, output the event as a possible new event if it is not a locally reoccurring event, and publish a promote event to the second stage process if it is close to expiration. The second stage process processes/receives a given input event from a first stage process, decodes the key for the event, looks up the key in the in-memory state (e.g., global lookup table 116), updates the global state table, outputs the event if it is a new event (e.g., it is not a globally reoccurring event), and publishes the global state to the first stage processes.

Figure 3A:
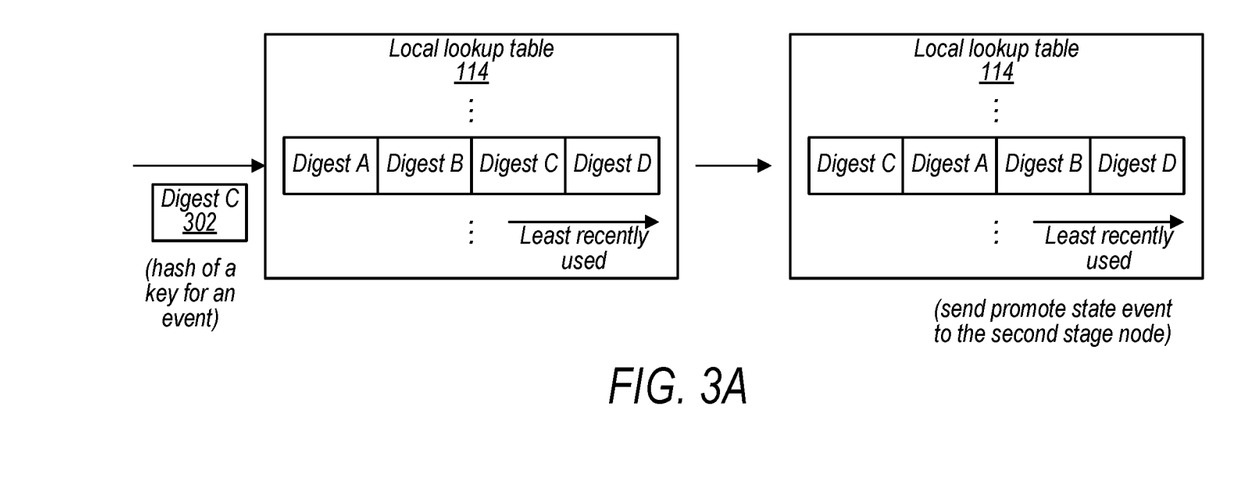
FIG. 3A illustrates re-ordering entries in a local lookup table based on a local reoccurring event, according to some embodiments.

FIG. 3A illustrates re-ordering entries in a local lookup table based on a local reoccurring event, according to some embodiments.

In the depicted embodiment, a first stage process generates digest C 302 for an obtained event (e.g., a hash of a key for the event) and determines, based on digest C and the local lookup table, that the event is a reoccurring event (since digest C matches an entry in the table). As shown, the first stage process updates the local state by re-ordering the group of four entries such that the entry for digest C is at the front.

In the example, the local lookup table may have any number of rows, where each row includes a group of four digest entries that are ordered from most recently used (matched) to recently used (matched) and a given generated digest will map to one of the rows based on a hashing/mapping algorithm for the lookup table (e.g., each row may correspond to a range of digest values). In various embodiments, each row may include any other number of entries (e.g., 8, 16, etc.).

Figure 3B:
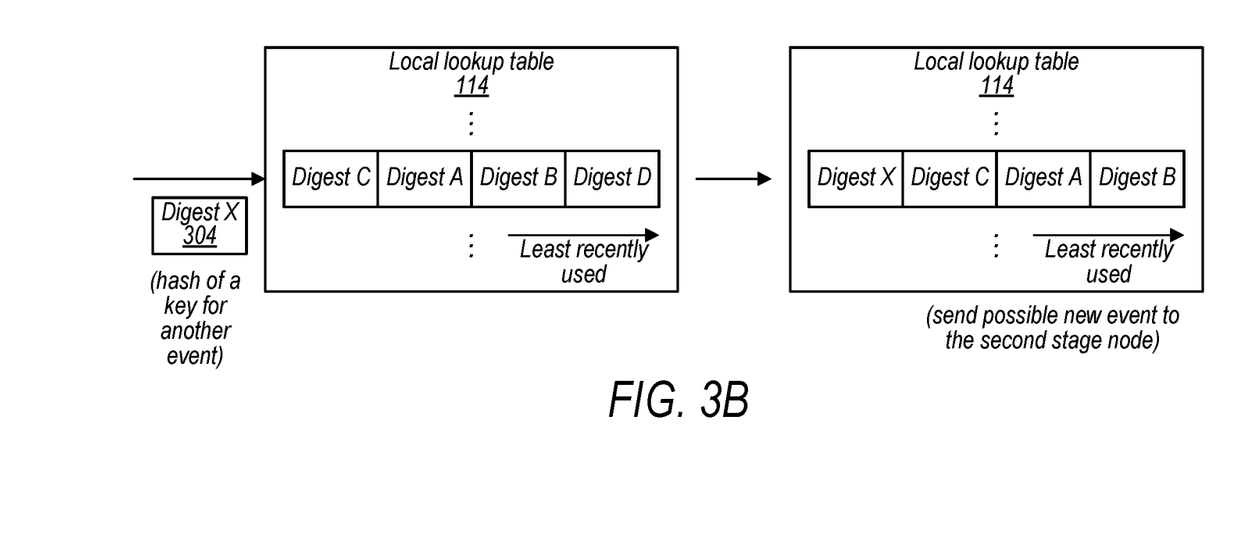
FIG. 3B illustrates inserting an entry into a local lookup table based on an event that is not a locally reoccurring event, according to some embodiments.

Note that FIGS. 3A and 3B are illustrative examples, and any other suitable data structure and/or technique may be used for storing/updating a history of events received by a stage one or stage two processing node. For example, other data structures and/or techniques may be used to keep track of the temporal order that events were received (e.g., by sorting entries based on most recently to least recently seen/received events and/or by storing a timestamp corresponding to a time that each event was last seen/received). Instead of using a hash-based probabilistic data structure that stores a digest (hash of a key for an event), in some embodiments the key for an event and/or an identifier for the event will be stored in the lookup table.

FIG. 3B illustrates inserting an entry into a local lookup table based on an event that is not a locally reoccurring event, according to some embodiments.

In the depicted embodiment, the first stage process generates digest X 304 for another obtained event and determines, based on digest X and the local lookup table, that the other event is not a reoccurring event (since digest X does not match an entry in the table). As shown, the first stage process updates the local state by inserting an entry for digest X into the front of the ordered group of entries and removes/evicts the last entry (digest D) to make room for inserting the entry for digest X. In embodiments, this may prevent the size of the local state from becoming too large, which could result in slower lookup times.

Figure 4:
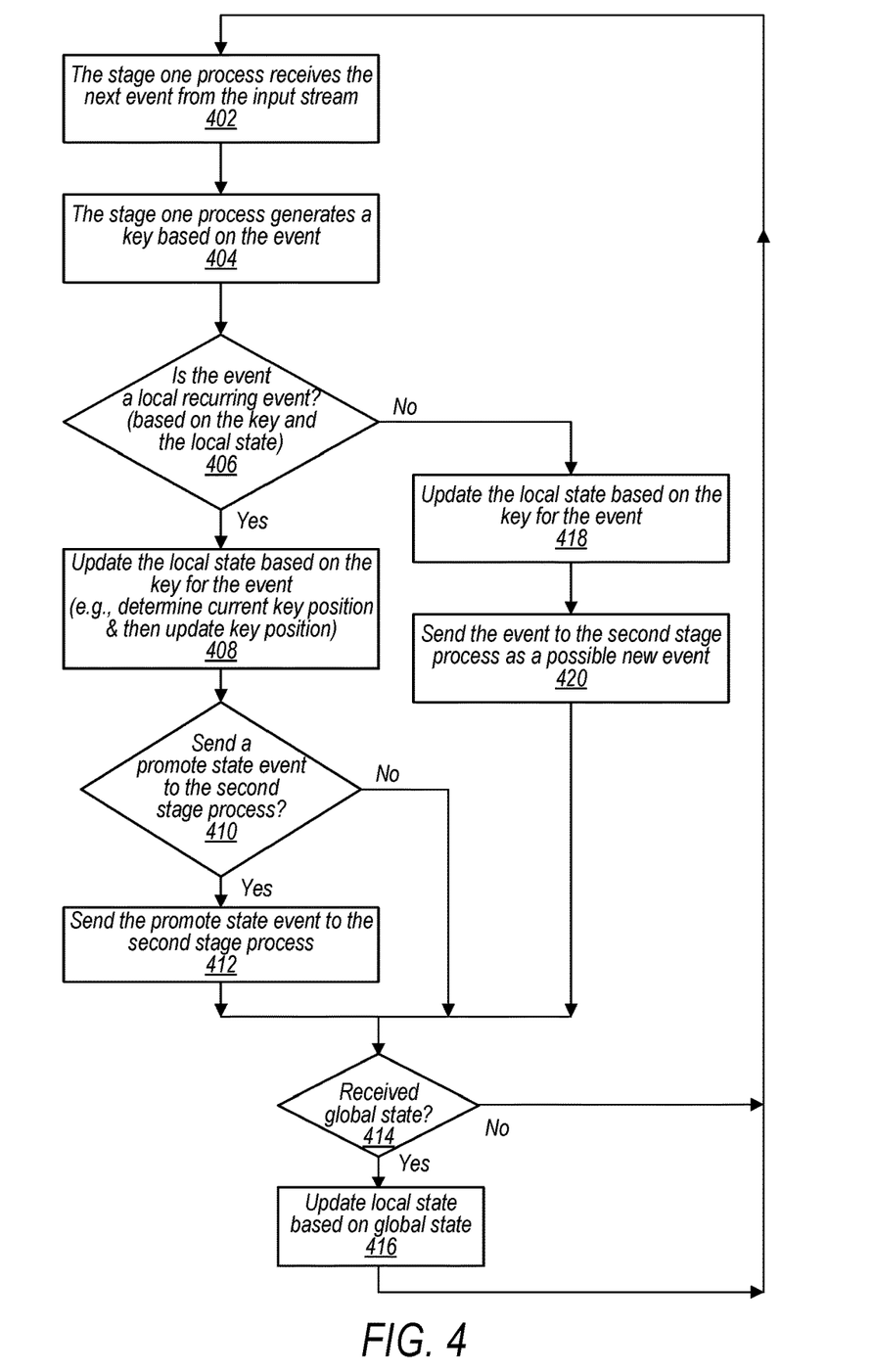
FIG. 4 is a flow diagram that illustrates a stage one process that sends different events to a stage two process based on events obtained from an input stream, according to some embodiments.

FIG. 4 is a flow diagram that illustrates a stage one process that sends different events to a stage two process based on events obtained from an input stream, according to some embodiments.

At block 402, a stage one process receives/obtains the next event from an input stream of events. At block 404, the stage one process generates a key based on the event. At block 406, the stage one process determines whether the event is a local reoccurring event (based on the key and the local state). If so, then at block 408, the stage one process updates the local state based on the key for the event (e.g., updates a property of the local table, such as positions of entries and/or a value of a timestamp for an entry). In embodiments, the stage one process may determine the current position of the key or digest in the row and/or table and then update the position of the key or digest (e.g., re-ordering a group/row of entries in the local lookup table, wherein an entry that corresponds to the key for the event is moved ahead within the group/row of entries according to a most recently used to least recently used ordering).

In some embodiments, to update the local state, the stage one process may instead determine the previous timestamp of the key or digest for the entry and then update the timestamp for the key or digest (e.g., update the timestamp to indicate a time that corresponds to the most recent reception of the event by the stage one process). In embodiments, use of a timestamp may avoid the need to re-order entries as part of the updating of the local state.

The above techniques are two examples of how the local state (or the global state) may be updated by a stage one process (or stage two process). However, any other suitable technique may be used to update the local state or global state in order to keep track of the temporal order of received events and/or to keep track of the time that events are received, in embodiments.

At block 410, the stage one process determines whether to send a promote key event to the second stage process (e.g., using the current position of the entry that was determined at block 408 or the previous timestamp of the entry determined at block 408 to determine whether the event is close to expiring at the second stage). In embodiments, the stage one process may determine to send the promote key event if the stage one process determines that the key or digest is within a threshold number of positions from the end of a sorted row or within a threshold period of time from expiring (based on a timestamp for the entry). For example, the stage one process may determine whether the current position of the key is within the bottom half of entries ordered from most recently used to least recently used. If so, then at block 412, the stage one process sends the promote state event to the second stage process and proceeds to block 414. If not, then the process skips block 412 and proceeds to block 414.

In some embodiments, the stage one process may instead determine whether the amount of time since the event was previously received is at least a threshold amount of time (e.g., by subtracting the previous timestamp from the updated timestamp). If so, then at block 412, the stage one process sends the promote state event to the second stage process and proceeds to block 414. If not, then the process skips block 412 and proceeds to block 414.

At block 414, the stage one process determines whether it has received a global state (or at least a portion of the global state) from the stage two process. If so, then at block 416, the stage one process updates the local state based on the global state; the process then returns to block 402. If the stage one process determines that it has not received a global state from the stage two process, then the process returns to block 402.

Returning to block 406, if the stage one process determines that the event is not a local reoccurring event (e.g., is a possible new event), then at block 418, the stage one process updates the local state based on the key for the event. In embodiments, this may include inserting a new entry into the local lookup table, where the new entry corresponds to the key for the event (e.g., the entry includes the key and/or digest). In some embodiments, the stage one process may expire another entry from the local lookup table (e.g., an entry that corresponds to another event) in order to make room for inserting the new entry. For example, the stage one process may evict/remove the last entry in a row, as describe for FIG. 3. At block 420, the stage one process sends the event to the second stage process as a possible new event. The process then proceeds to block 414.

Figure 5:
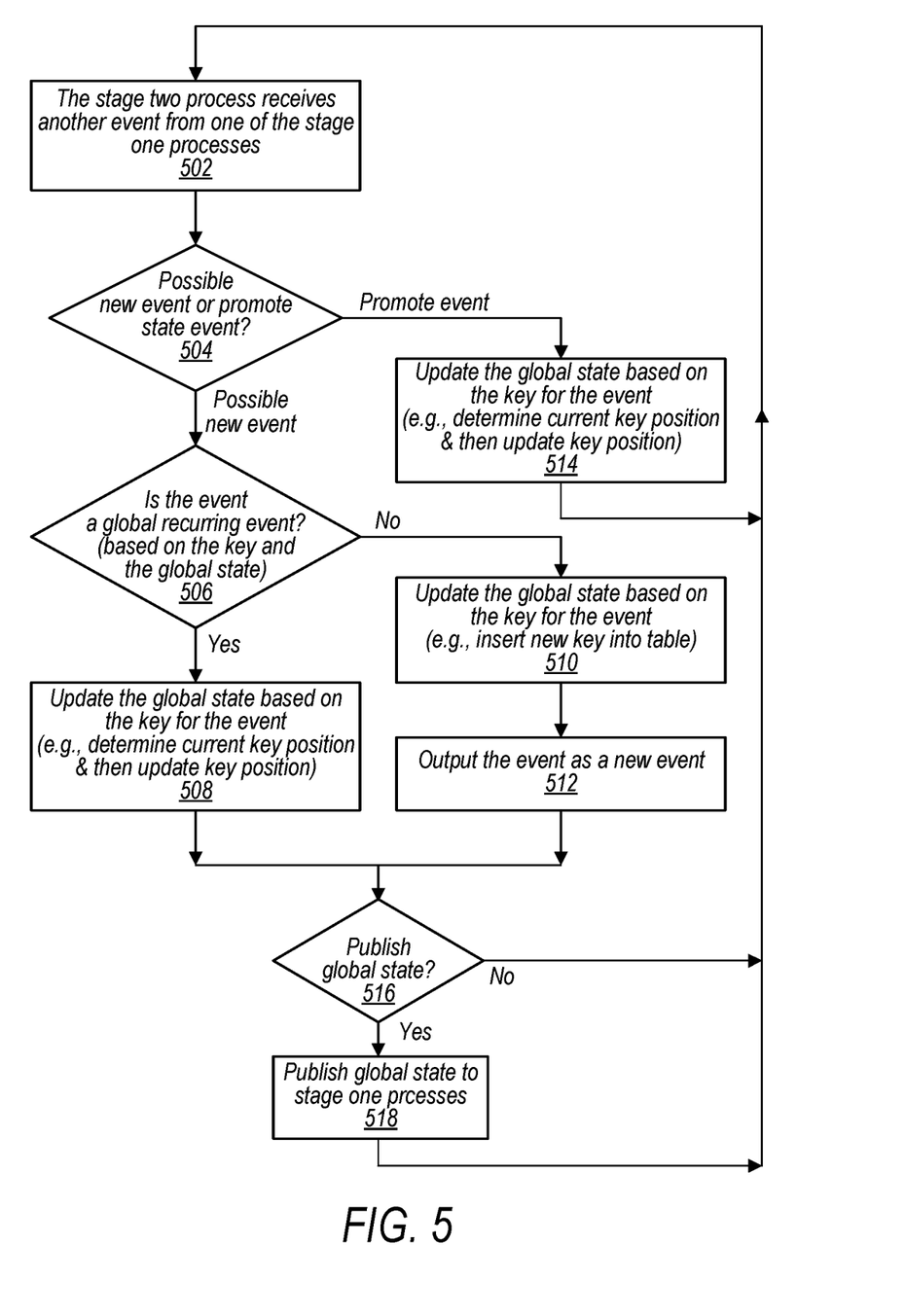
FIG. 5 is a flow diagram that illustrates a stage two process that updates a global state and outputs new events based on events received from concurrent stage one processes, according to some embodiments.
Figure 6:
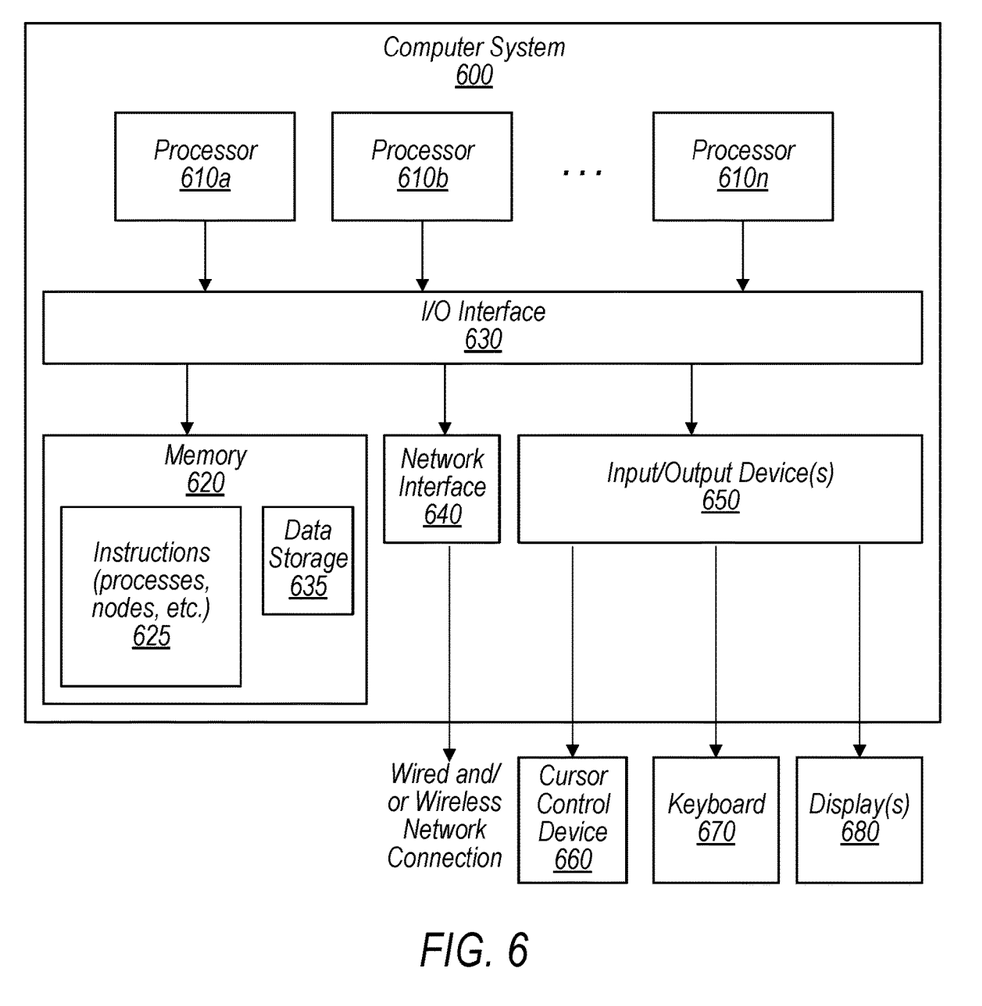
FIG. 6 is a block diagram illustrating an example computer system that implements some or all of the techniques described herein, according to some embodiments.

FIG. 5 is a flow diagram that illustrates a stage two process that updates a global state and outputs new events based on events received from concurrent stage one processes, according to some embodiments.

At block 502, the stage two process receives another event from a stage one process (as in stage one, the stage two process may also generate a key based on the event). At block 504, if the stage two process determines that the received event is a possible new event, then at block 506, the stage two process determines whether the event is a globally reoccurring event.

If the event is a globally reoccurring event, then at block 508, the stage two process updates the global state based on the key for the event (e.g., as described for updating the local state in FIG. 4) and proceeds to block 516. If not, then at block 510, the stage two process updates the global state based on the key for the event (e.g., inserting the new key into the global state table). In embodiments, this may include expiring another entry, as described for FIG. 4. At block 512, the stage two process outputs the event as a new event. The process then proceeds to block 516.

Returning to block 504, if the stage two process determines that the received event is a promote event, then at block 514, the stage two process updates the global state based on the key for the event (e.g., as described for updating the local state in FIG. 4). As shown, process then returns to block 502. In some embodiments, the process may instead proceed to block 516, described below.

At block 516, the stage two process determines whether to publish the global state to each of the stage one processes, so they can each update their local states based on the updated global state. For example, if the stage two process sends its state out every 10 minutes, then it may determine whether at least 10 minutes have elapsed since the global state was last published. If so, then the stage two process may publish the global state at block 518. If not, then the process returns to block 502, without publishing the global state.

Any of various computer systems may be configured to implement processes associated with the nodes, processes, or any components of the above figures. For example, FIG. 6 is a block diagram illustrating an example computer system that implements some or all of the techniques described herein, according to some embodiments.

In various embodiments, the nodes, processes, or any components of any of FIGS. 1-5 may be implemented by one or more computer systems 600 such as that illustrated in FIG. 6. In embodiments, any of the components of any of FIGS. 1-5 may include one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for nodes, processes, etc.), are shown stored within system memory 620 as program instructions 625. In some embodiments, system memory 620 may include data 635 which may be configured as described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other computer systems 600 or devices attached to a network, such as the local network discussed above, a wide-area network, or a local network within the provider network, for example. In particular, network interface 640 may be configured to allow communication between computer system 600 and/or various I/O devices 650. I/O devices 650 may include scanning devices, display devices, input devices and/or other communication devices, as described herein.

Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630.

A computer-readable storage medium may also include any volatile or non-volatile media such as RAM (e.g., SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

In some embodiments, I/O devices 650 may be relatively simple or "thin" client devices. For example, I/O devices 650 may be configured as dumb terminals with display, data entry and communications capabilities, but otherwise little computational functionality. However, in some embodiments, I/O devices 650 may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices 650 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 650 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device 650 (e.g., cursor control device 660, keyboard 670, or display(s) 680 may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the certificate revocation manager, the services, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a plurality of first stage computing nodes of an event deduplication system, wherein the first stage computing nodes respectively comprise one or more processors and memory, wherein a given first stage computing node of the plurality of first stage computing nodes is configured to implement a first stage process to, for an event of a plurality of events obtained from an input stream:
   determine, based on a key for the event and a local state, whether the event is a local reoccurring event;
   in response to a determination that the event is not a local reoccurring event:
   update the local state based on the key for the event; and
   send the event to a second stage process of the event deduplication system as a possible new event; and
   in response to a determination that the event is a local reoccurring event:
   determine, based on the key for the event and the local state, whether to send a promote state event to the second stage process;
   in response to a determination to send the promote state event, send the promote state event to the second stage process; and
   update the local state based on the key for the event; and
   a second stage computing node of the event deduplication system, wherein the second stage computing node comprises one or more other processors and memory, wherein the second stage computing node is configured to implement the second stage process to:
   in response to reception of the event as a possible new event:
   determine, based on the key for the event and a global state, whether the event is a global reoccurring event;
   in response to a determination that the event is not a global reoccurring event, update the global state based on the key for the event and output the event as a new event; and
   in response to a determination that the event is a global reoccurring event, update the global state based on the key for the event;
   and
   in response to reception of the promote state event, update the global state based on the key for the event.

2. The system of claim 1, wherein the local state comprises a local lookup table, and wherein to determine that the event is not a local reoccurring event, the first stage process is configured to:
   determine, based on the key for the event, that an entry for the event does not exist in the local lookup table.

3. The system of claim 1, wherein the local state comprises a local lookup table, and wherein to update the local state based on the key for the event in response to a determination that the event is not a local reoccurring event, the first stage process is configured to:
   insert an entry into the local lookup table that corresponds to the key for the event.

4. The system of claim 1, wherein the local state comprises a local lookup table, and wherein to update the local state based on the key for the event in response to a determination that the event is a local reoccurring event, the first stage process is configured to:
   re-order a group of entries in the local lookup table, wherein an entry that corresponds to the key for the event is moved ahead within the group of entries according to a most recently used to least recently used ordering, or
   update a timestamp for the entry that corresponds to the key for the event.

5. The system of claim 1, wherein the global state comprises a global lookup table, and wherein to determine that the event is not a global reoccurring event, the second stage process is configured to:

determine, based on the key for the event, that an entry for the event does not exist in the global lookup table.

6. A method, comprising:
performing, by a first stage process of a computing node:
  obtaining an event from an input stream of events;
  determining, based on a key for the event and a local state, whether the event is a local reoccurring event;
  in response to determining that the event is not a local reoccurring event:
    updating the local state based on the key for the event; and
    sending the event to a second stage process as a possible new event; and
performing, by the second stage process of another computing node:
  receiving the event as a possible new event;
  determining, based on the key for the event and a global state, whether the event is a global reoccurring event; and
  in response to determining that the event is not a global reoccurring event:
    updating the global state based on the key for the event; and
    outputting the event as a new event; and
  sending at least a portion of the global state to the first stage process to update the local state.

7. The method of claim 6, further comprising:
performing, by the first stage process:
  obtaining another event from the input stream;
  determining, based on a key for the other event and the local state, that the other event is a local reoccurring event;
  in response to determining that the other event is a local reoccurring event:
    determining, based on the key for the other event and a property of the local state, whether to send a promote state event to the second stage process;
    in response determining to send the promote state event, sending the promote state event to the second stage process; and
    updating the property of the local state based on the key for the other event; and
performing, by the second stage process:
  receiving the promote state event; and
  in response to receiving the promote state event, updating a global state based on the key for the other event.

8. The method of claim 7, wherein the local state comprises a local lookup table, and wherein updating the property of the local state based on the key for the other event comprises:
  re-ordering a group of entries in the local lookup table, wherein an entry that corresponds to the key for the other event is moved ahead within the group of entries according to a most recently used to least recently used ordering, or
  updating a timestamp for the entry that corresponds to the key for the other event.

9. The method of claim 6, wherein the local state comprises a local lookup table, and wherein determining that the event is not a local reoccurring event comprises:
  determining, based on the key for the event, that an entry for the event does not exist in the local lookup table.

10. The method of claim 9, wherein determining, based on the key for the event, that an entry for the event does not exist in the local lookup table comprises:
  generating a digest based on a hash of the key; and
  determining that the local lookup table does not have an entry for the digest.

11. The method of claim 6, wherein the local state comprises a local lookup table, and wherein updating the local state based on the key for the event comprises:
  expiring an entry from the local lookup table that corresponds to a key for another event; and
  inserting a new entry into the local lookup table that corresponds to the key for the event.

12. The method of claim 6, further comprising:
  identifying a plurality of portions of data based on the obtained event; and
  generating the key based on the plurality of portions of data.

13. The method of claim 6, further comprising:
performing, by a first stage process of a computing node:
  receiving, from the other computing note, at least a portion of the global state; and
  in response to receiving at least the portion of the global state, updating the local state based on at least the portion of the global state.

14. The method of claim 6, wherein a network comprises the computing node and another network comprises the other computing node, and wherein the network is remote from the other network, and wherein the first stage process runs concurrent with other first stage processes at other computing nodes that send other events to the second stage process as other possible new events.

15. One or more non-transitory computer-accessible storage media storing program instructions that when executed on or across one or more processors of a second stage computing node of an event deduplication system, cause the one or more processors to implement a second stage process to:
  receive, from different first stage processes on different first stage computing nodes of the event deduplication system, a plurality of possible new events obtained by the different first stage processes from different input streams, wherein for an event of the plurality of possible new events obtained by a given first stage process from a given input stream, the one or more processors implement the second stage process to:
    determine, based on a key for the event and a global state, whether the event is a global reoccurring event;
    in response to a determination that the event is not a global reoccurring event, update the global state based on the key for the event and output the event as a new event; and
  send at least a portion of the global state to the different first stage processes to update a local state associated with the different first stage processes.

16. The one or more storage media as recited in claim 15, wherein the global state comprises a global lookup table, and wherein to update the global state based on the key for the event, the program instructions when executed on or across the one or more processors further cause the one or more processors to implement the second stage process to:
  insert an entry into the global lookup table that corresponds to the key for the event.

17. The one or more storage media as recited in claim 15, further comprising program instructions that when executed on or across the one or more processors further cause the one or more processors to implement the second stage process to:
  receive another possible new event from one of the first stage processes;

determine, based on a key for the other possible new event and the global state, whether the other possible new event is a global reoccurring event; and in response to a determination that the other possible new event is a global reoccurring event, update the global state based on the key for the other possible new event.

18. The one or more storage media as recited in claim 17, wherein the global state comprises a global lookup table, and wherein to update the global state based on the key for the other possible new event, the program instructions when executed on or across the one or more processors further cause the one or more processors to implement the second stage process to:

re-order a group of entries in the global lookup table, wherein an entry that corresponds to the key for the other possible new event is moved ahead within the group of entries according to a most recently used to least recently used ordering, or update a timestamp for the entry that corresponds to the key for the other possible new event.

19. The one or more storage media as recited in claim 15, further comprising program instructions that when executed on or across the one or more processors further cause the one or more processors to implement the second stage process to:

receive a promote state event from one of the first stage processes, wherein the promote state event corresponds to a recurring event obtained by the first stage process; and in response to reception of the promote state event, update the global state based on a key for the recurring event.

20. The one or more storage media as recited in claim 15, further comprising program instructions that when executed on or across the one or more processors further cause the one or more processors to implement the second stage process to:

receive a request from one of the first stage processes for the global state; and in response to reception of the request, send at least the portion of the global state to the first stage process.

\* \* \* \* \*